INVENTORS
LYLE J. BUTTERWORTH
DONALD G. SHEFFER
LARRY D. HIEGEL
ATTORNEY

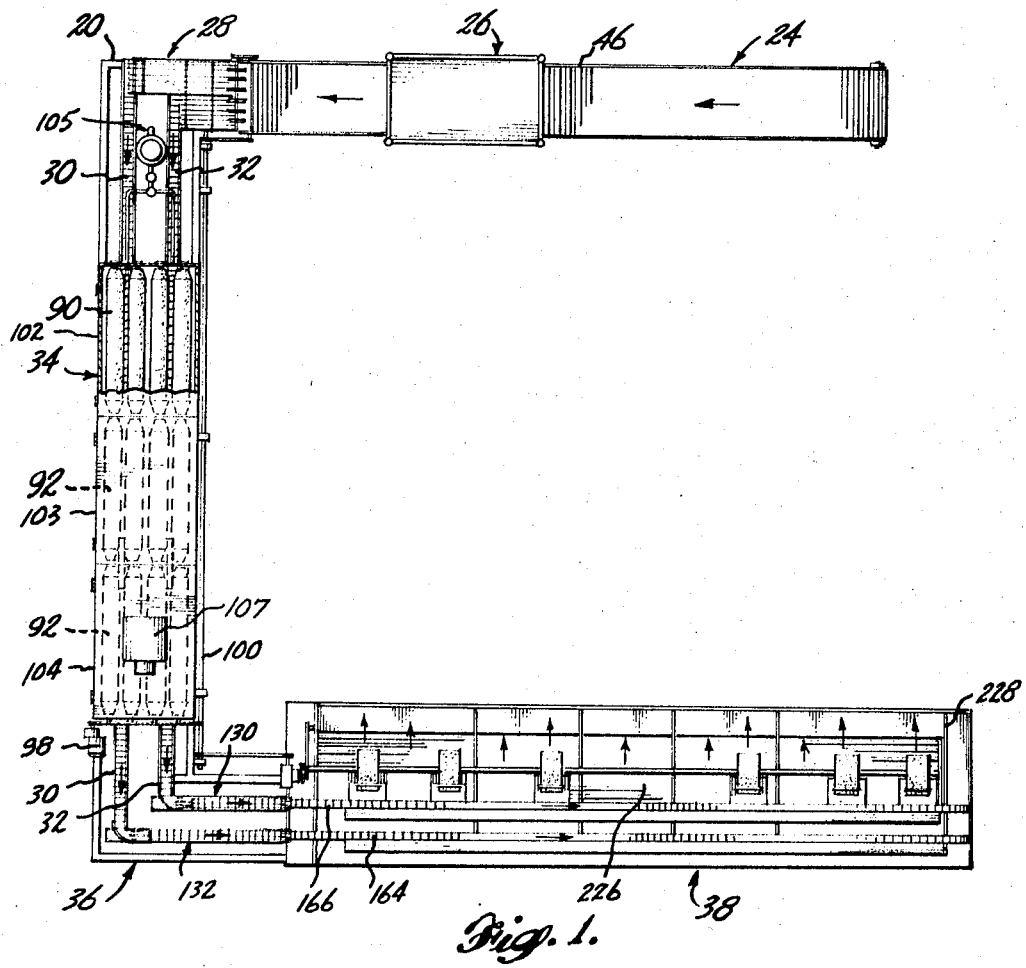

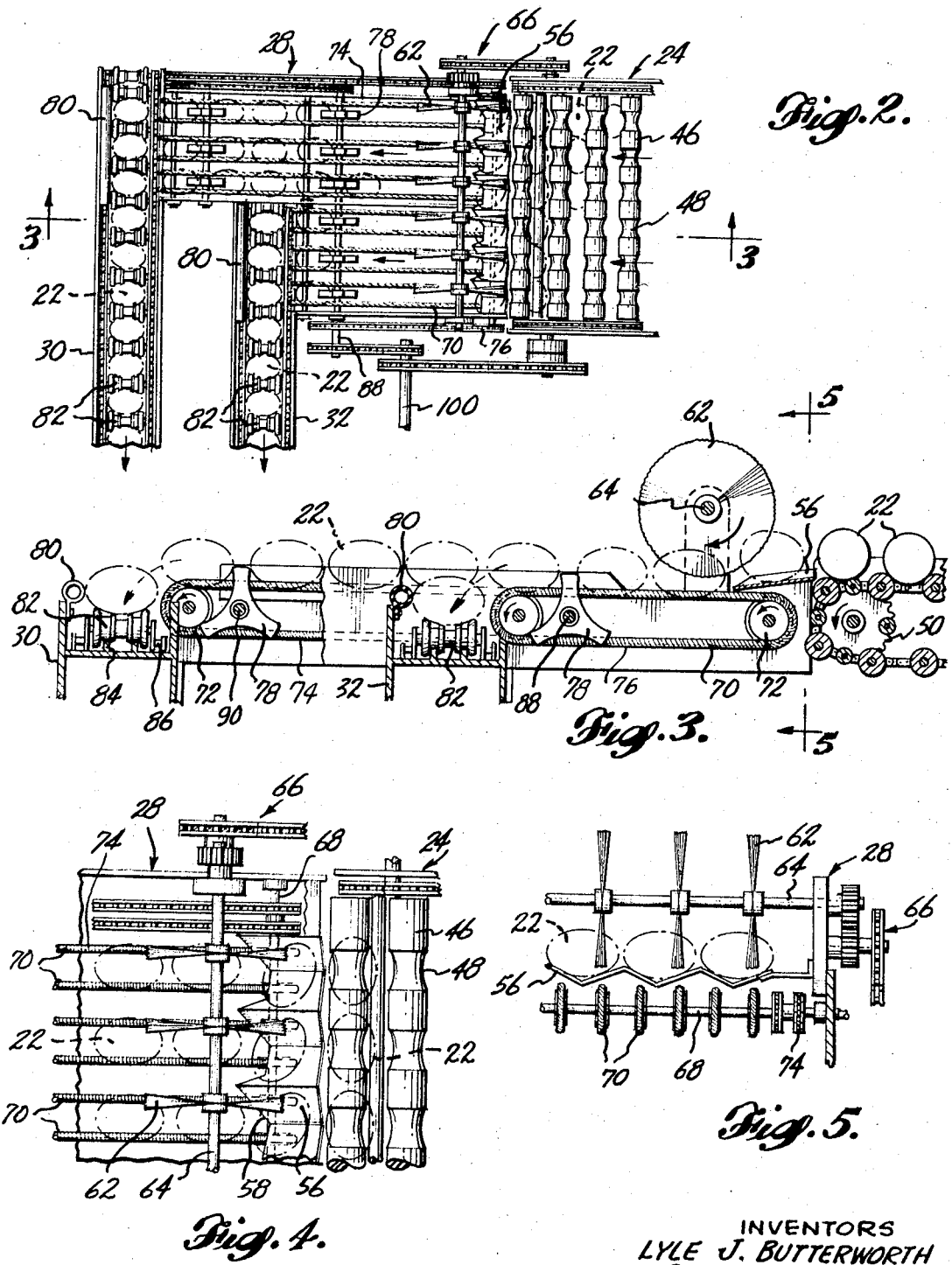

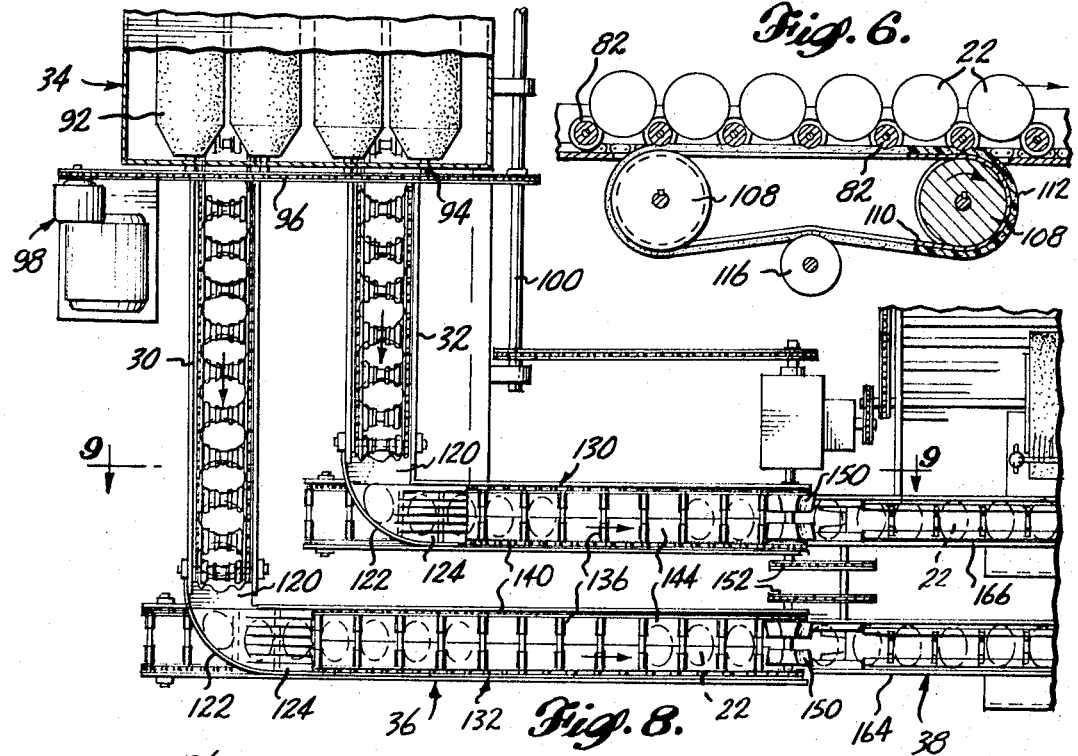
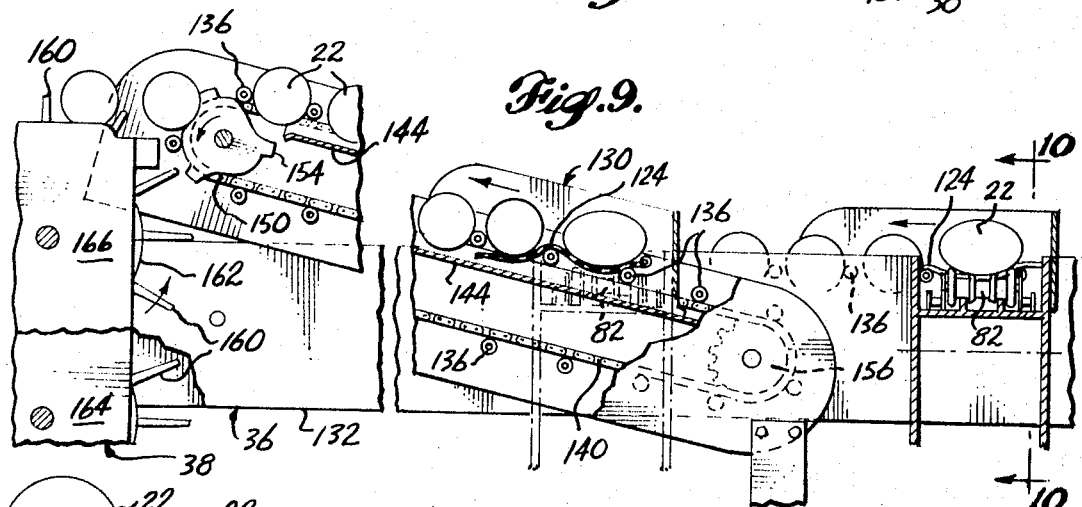
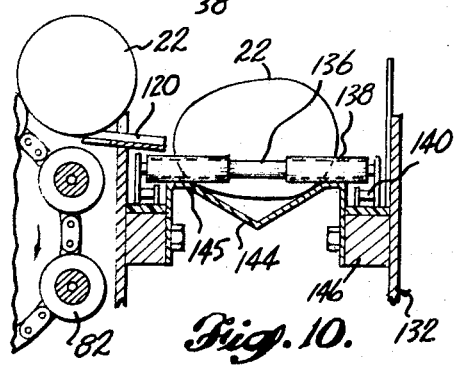
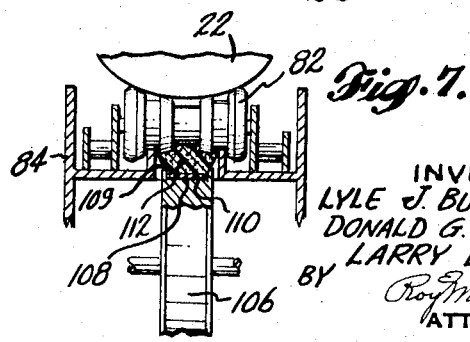
INVENTORS
LYLE J. BUTTERWORTH
DONALD G. SCHEFFER
LARRY D. HIEGEL
BY Roy Mattern Jr.
ATTORNEY

United States Patent Office 3,447,176
Patented June 3, 1969

3,447,176
AUTOMATIC MACHINE FOR CANDLING, CLEANING, SANITIZING, AND GRADING OF EGGS
Lyle J. Butterworth, Tacoma, Larry D. Hiegel, Seattle, and Donald G. Scheffer, Renton, Wash., assignors to Dawson and Co., Inc., Tacoma, Wash., a corporation of Washington
Filed Oct. 10, 1967, Ser. No. 674,318
Int. Cl. A01k 43/08, 43/00
U.S. Cl. 15—3.11                                9 Claims

ABSTRACT OF THE DISCLOSURE

An automatic egg processing machine receives eggs on moving rolls of a cross loader guiding them through a candler for inspection. Thereafter eggs are moved on "around a corner and converging conveyor" which utilizes rotating brushes for egg orientation and paired coiled spring conveyors and spool conveyors for egg transporting. Eggs then continue on through washing, brushing, sanitizing and drying units. The latter include a relative moving sponge padded belt which absorbs moisture. Subsequently eggs are moved by a "around a corner and elevation differential conveyor." During such movement eggs are individually turned, guided, cushioned and directed to two levels to respective conveyors utilizing spaced, paired, upright, pusher arms. Then grading by weight is undertaken as eggs pivot calibrated responsive weight sensors positioned in line with the moving pusher arm conveyor. As weight sensors pivot, their guided magnet moves past a mercury switch controlling energy directed to a specific egg ejector. Ejected eggs are directed into corresponding rollaway grading sections. In so moving upon ejection from the top conveyor, eggs are lowered in a rotating brush to common level grading trays.

RELATED APPLICATIONS

A related application Ser. No. 674,319, filed Oct. 10, 1967, applicant Lyle J. Butterworth, entitled, "Brushes for Automatic Egg Cleaning Machine," application concerns brushes in a machine environment which are also useful in this illustrated and described automatic machine during egg cleaning operations.

BACKGROUND

Some of the components and their utilization in embodiments which are illustrated in accompanying drawings will be observed in patents issued to Clyde C. Powell, 2,554,878, 2,714,786, both concerning automatic egg cleaning machines and 2,818,173, 2,818,174, both concerning automatic egg scales.

DRAWINGS

The preferred embodiment of this automatic machine for candling, cleaning, sanitizing and grading of eggs is illustrated in accompanying drawings wherein:

FIGURE 1 is a top view of the preferred arrangement of components to obtain a desirable egg processing flow path as indicated by the direction arrows;

FIGURE 2 is a top view, enlarged, of the first "cornering" components, essentially of respective conveyors shown in FIGURE 1;

FIGURE 3 is a sectional view enlarged, of cornering components, taken as indicated by section line 3—3 of FIGURE 2;

FIGURE 4 is a partial plan view, enlarged, of some of the first "cornering" components at their commencement where eggs are turned;

FIGURE 5 is a partial sectional view taken as indicated by section line 5—5 of FIGURE 3;

Figure 11:
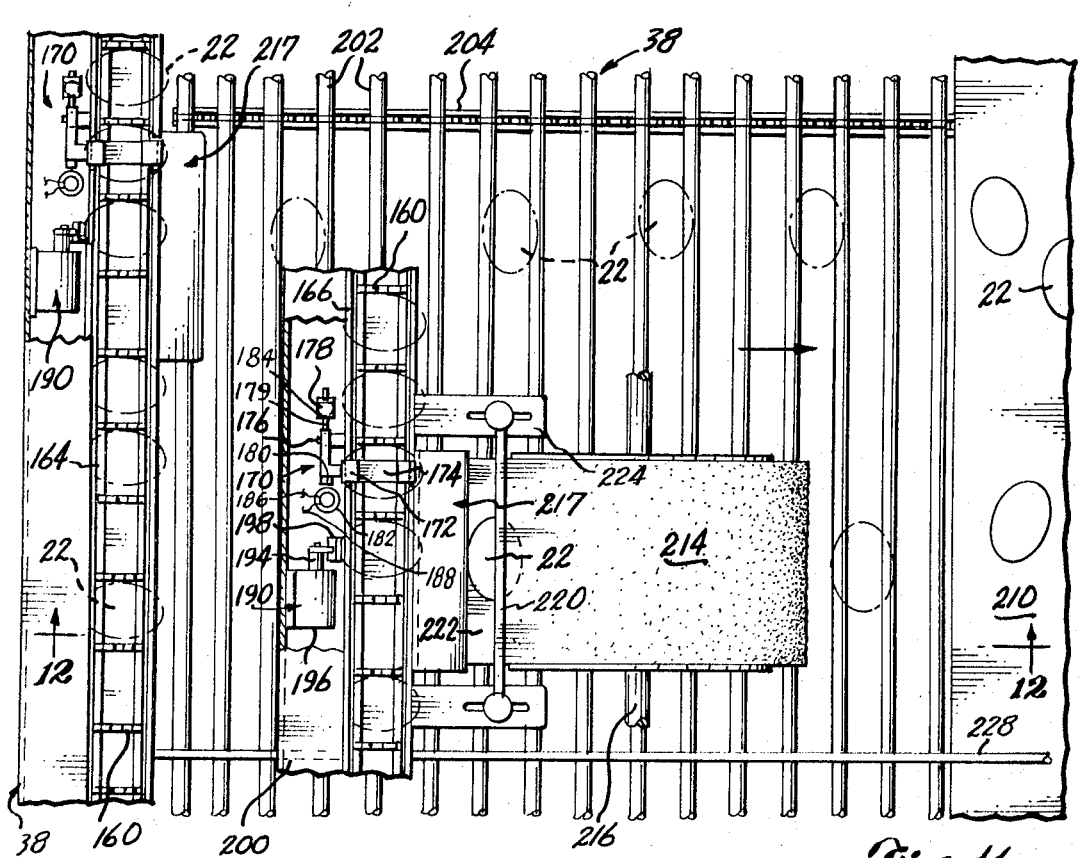
Figure 12:
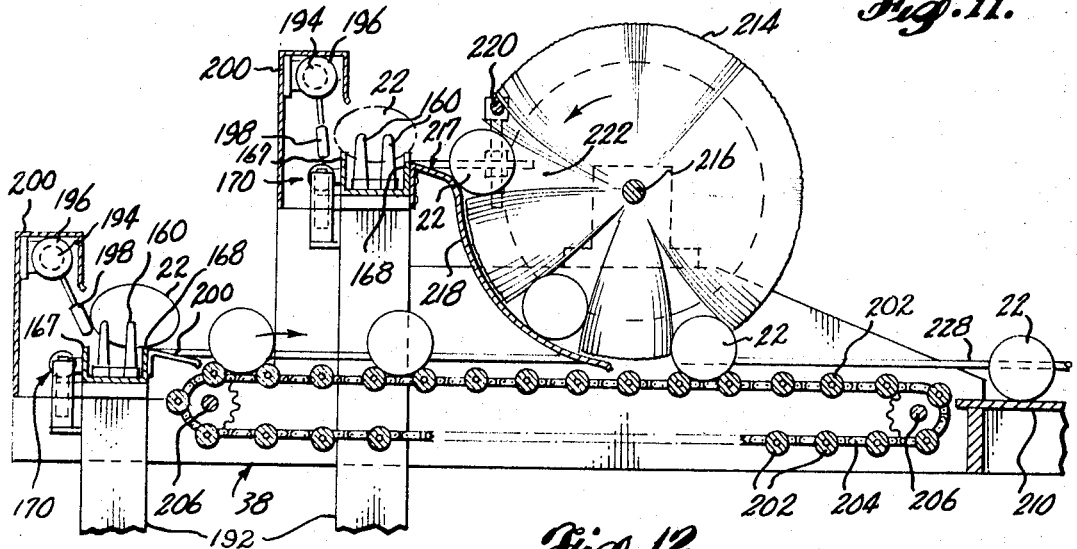

FIGURE 6 is a side view with portions broken away and others sectioned in a location as indicated in FIGURE 1, within an egg cleaner along a conveyor where drying operations are commencing, to s how where belts, covered with sponge materials, are driven at speeds relative to moving conveyor spools to collect moisture from them and deposit collected water below the conveyor as an offset idler roller is passed over;

FIGURE 7 is a partial cross sectional view taken through portions of the sponge covered drying belt assembly illustrated in FIGURE 6;

FIGURE 8 is a plan view, enlarged, of the terminus of a dryer and a second grouping of "cornering" components, essentially of respective conveyors shown in FIGURE 1;

FIGURE 9 is a sectional view, enlarged and with portions removed to show cornering components taken as indicated by section line 9—9 of FIGURE 8;

FIGURE 10 is a sectional view, enlarged and with portions removed to show cornering components, taken as indicated by section line 10—10 of FIGURE 9;

FIGURE 11 is a plan view, enlarged, of a commencement of an egg grader after the second cornering showing ejection of eggs by weight from respective low and high conveyors to rollaway grading sections; and FIGURE 12 is a sectional view taken through a commencement of an egg grader, as illustrated in FIGURE 11, showing ejection of eggs by weight from respective low and high conveyors and also showing the lowering of eggs from a high conveyor as eggs are carried in respective continuously preformed pockets in a rotating brush and then deposited below by the brush on the same rollaway grading section that is receiving eggs ejected from the lower conveyor.

INTRODUCTION TO PREFERRED EMBODIMENT

The preferred embodiment of this invention is designed to occupy a comparitively smaller floor space in a conventional rectangular or square room or floor space, by changing the direction of such conveyors to position all machine components closer together. However, some modifications of the arrangement are possible to accommodate other types of available spaces.

Also this preferred embodiment is designed to process eggs at a higher production rate by increasing the egg conveyor facilities of the machine. Eggs are first received on a wide conveying unit, then arranged into narrower conveying units as their surfaces are improved by various processes, and subsequently rearranged into several adjacent areas as they are graded for packaging.

GENERAL ARRANGEMENT

A general arrangement of the preferred embodiment of overall machine 20 is illustrated in FIGURE 1. Eggs 22 are deposited generally from vacuum lifts, not shown, on to cross loader 24 where they are moved in a direction indicated by arrows. Thereafter eggs are moved by cross loader 24 through a candling observation enclosure 26. Eggs surviving inspection are received by a "cornering and converging" conveyor 28 as they leave cross loader 24.

After this direction change, eggs 22 leave conveyor 28 to travel on side by side conveyors 30, 32 which continue without a direction change throughout an assembly 34 of egg surface process equipment wherein washing, sanitizing and drying are undertaken. Soon after conclusion of such processing, eggs leave conveyors 30, 32 and are changed in their travel direction and carried in respective groups to two different elevations by "cornering and elevating" conveyor 36.

After this direction and elevation change, eggs 22 are transferred from conveyor 36 to a commencing two level grader 38 which eventually arranges eggs 22 in several grouping areas located at a common level where they are conveniently gathered for packaging.

To provide this general arrangement which improves the overall operation efficiency and which is effective in utilizing minimum spaces, improvements have been made throughout all conveying apparatus and also in some of the processing equipment. These improvements are described under following headings which are presented in sequence that is quite similar to the sequence of all egg handling and processing steps performed by machine 20.

CROSS LOADER AND CANDLER

As illustrated in FIGURE 1, eggs 22 are loaded on a cross loader 24 generally by depositing them from a vacuum lift which is not shown. This loading is indicated also in FIGURES 2, 3 and 4 where eggs are placed on transverse rollers 46 which have, along their lengths, respective grooves 48 to direct eggs into multiple rows. Such arranging of eggs occurs as these rollers 46, secured together in a continuous group, are moved by a powered sprocket 50 in the direction indicated by arrows. During such movement, each roller 46 also revolves about its own center resulting in effective alignment of all eggs into these multiple paths corresponding to grooves 46. Such grooves determine six rows of eggs when arranged on rollers 46 as shown in FIGURES 1 and 2.

While traveling in such rows, all eggs are rotating about their major axes and therefore are readily inspected in candler 26. An operator undertakes the inspection utilizing direct and reflected light respectively from lamps and mirrors.

CORNERING AND CONVERGING CONVEYOR

Those eggs 22, passing candling inspections, are delivered by rollers 46 of cross loader 24 to a "cornering and converging" conveyor 28, as illustrated in FIGURES 1 through 5. The first contact eggs make with conveyor 28 occurs as an egg slides down and over a lower receiving cam track 56 which has a shallow V transverse cross sectional form extending for a greater length 58 on one of its sides in the direction of conveyor travel.

At this location, as each egg is about to leave lower receiving cam track 56, it is turned 90° as two separately created forces become effective at about the same time. One force is initiated, to delay, by comparison, one side of each egg. This force is created by revolving in like direction a brush 62 around shaft 64 to contact one egg end at a speed substantially comparable to the cross loader roller speed. At this same moment of time, the opposite egg end is forcefully contacted by one continuously moving endless coiled spring 70 which complete the turning of the egg. Spring 70 is traveling at a higher speed than the speed of brush 62. The opposite spring 70 of two such chains which are paired to thereafter convey egg 22, is preventd initially from simultaneously contacting egg 22 by the integral overhang or extension 58 of lower receiving cam track 56.

In this way, each egg is turned 90° at this initial starting location of "cornering and converging" conveyor 28 and thereafter an egg continues on its way carried on these two spaced endless coiled spring driven around wheels 72. One wheel 72 is powered by driving components 66 which turn shaft 64. These driving components 66 and others, receive power distributed through shaft 100 which is preferably powered by operating electric motor 98 (shown in FIGURE 8).

As noted in FIGURES 1, 2 and 3, six pairs of coiled springs 70 are arranged to receive eggs being delivered and turned from rows of eggs departing from cross loader 24. Three pairs of these six pairs of moving coiled springs 70 are shorter, terminating adjacent to conveyor 32 which is operating in a direction at right angles to moving coiled springs 70. Three other pairs of moving coiled springs 70 are longer, terminating adjacent conveyor 30 which is also arranged at right angles to moving coiled springs 70 and therefore parallel to conveyor 32.

As shown in FIGURES 2 and 3, moving coiled springs 70 quickly load respective conveyors 30, 32 each with three eggs at a time. Eggs 22 slide endwise into contact with spaced cradling rollers 82 which are being driven by a powered chain 86 as they rotate along spaced rails 84. Oversliding during this endwise loading is controlled by resilient bumpers 80 installed on conveyors 30, 32 opposite all paired coiled springs 70.

Although paired coiled springs 70 accomplish egg movement uniformly, when properly adjusted, other factors may be encountered which may indicate a need for "spacing" and "moving" eggs as they depart from coiled spring conveyors 70 to travel at right angles on conveyors 30 and 32. Such "spacing" and "moving" is then undertaken by powering at least six rotatable "three pocket" cams 78 which are located near the terminus of each coiled chain conveyor, whether it be a long conveyor 74 or a short one 76. Cams 78 are mounted on driven shafts 88 and 90 and driven at speeds which insure prompt loading of conveyors 30 and 32. These conveyors 30, 32 then carry eggs 22, after their "convergence and cornering" by this overall conveyor 28, on to assembly 34 of egg surface processing equipment.

EGG SURFACE PROCESSING EQUIPMENT

As shown in FIGURE 1, eggs 22, passing candling inspection and "cornered" and "converged" into two conveyors 30, 32 are ready for having their surfaces cleaned and sanitized as they are moved forward while simultaneously being rotated about their major axes. In assembly 34 of egg surface processing equipment, there are three sections, each having two powered counter-rotating brushes. Electric motor 98, through drive chain 96, powers all brush shafts 94 which are connected endwise and arranged in two somewhat aligned rows of brushes.

Scrubbing

In the first section 102, brushes 90 are made from spirally wound end to end groupings of bristles which are composed of both nylon and stainless steel as further described in related application Serial Number 674,319 filed on October 10, 1967. One brush construction suitable for use in the illustrated machine is composed of 80% nylon bristles having a .018" diameter and 20% stainless steel bristles having a .005" diameter. Brushes 90, when initially installed, before any wearing occurs, have a common tangent location throughout their lengths which is located above eggs 22 as they move by on the respective conveyors 30, 32. The motion of bristles downwardly from this tangent location carries them into contact with eggs 22 as each one is simultaneously rotating about its own major axis while carried forward on respective conveyor 30 or 32.

As indicated in C. C. Powell's Patent 2,714,786, noted previously the cleaning units must be arranged to scrub both tops and bottoms of eggs, so any shafts of circular longitudinal cleaners are not arranged parallel to one another. Although it is not illustrated, each set of brushes 92 is arranged so as shafts 94 converge, they are also raised, or vice versa, to insure this effective overall egg shell surface cleaning as eggs 22 also are caused to rotate about their own centers.

During this initial brushing by these compositely arranged nylon and stainless steel bristles, hot water and detergents are distributed throughout this cleaning section 102 by pumping, mixing, regulating and conduit distribution accessories indicated in a group assembly shown in FIGURE 1 at 105.

Sanitizing

With the initial cleaning process completed, eggs 22 are conveyed similarly through cleaning section 103 where brushes 92 composed of all nylon bristles continue a cleaning action. This action is undertaken while sanitizing fluids are being distributed from an accessory group assembly, not shown, which mixes chemicals and water together for spraying into cleaning section 103.

Drying-brush and fan

Upon completion of sanitizing eggs 22, drying of their surface is undertaken by using brushes 92 composed of all nylon bristles which are softer than those used previously. These brushes remove water droplets which are removed from enclosures 106 covering these cleaning sections by operating exhaust fans such as fan 107 shown in FIGURE 1.

Drying-moving sponge

Additional water collecting at the bottom of conveyors 30, 32 and also being carried by cradling rollers 82 is removed by a traveling endless belt 110 covered with a sponge 112 as shown in FIGURES 1, 6 and 7. When liquids cease to be distributed after eggs 22 pass beyond the half way mark of cleaning section 103, soon thereafter as shown in FIGURE 1, a sponge padded driven belt is installed below conveyors 30 and 32.

FIGURES 6 and 7 indicate in more detail the location of belt 110 with its sponge 112 immediately in contact with passing under surfaces of rotating cradling rollers 82 where they are made available between spaced rails 84. Wheels 108, one of which is powered, have a grooved circumferential construction 109 to receive belt 110 and place its sponge 112 into contact above with cradling rollers 82. The sponge 112 is long enough to, in effect, dry rollers 82 more than once so they in turn continue to dry egg surfaces. Unfortunately eggs do crack and sponge 112 is effective in removing the egg ingredients which leak out through cracks in egg shells.

Removal of debris and water from sponge 112 is effectively accomplished by passing belt 110 and its sponge 112 over idling roller 116 during "return" travel of belt 110. By making a directional change quite substantial over and about roller 116, water is automatically squeezed out of sponge 112 at this location shown in FIGURE 6. Debris is also carried away with removed water as it is drained away by collectors and conduits, not shown.

CORNERING AND ELEVATION CHANGING CONVEYOR ASSEMBLY

Eggs, inspected, cleaned, sanitized and dried, and leaving assembly 34 on conveyors 30, 32, as shown in FIGURES 1, 8, 9 and 10, are thereafter guided by conveyor assembly 36. In assembly 36, eggs are turned to travel in a direction at right angles to their travel through assembly 34. This new direction of travel is also parallel to their travel along cross loader 24 but in an opposite direction. While such direction changes are underway a substantial elevation change is also undertaken to position eggs 22 for subsequent grading by a grader 38 which initially grades eggs 22 on two levels before arranging them at one level for packaging.

Cornering

As shown in FIGURE 8, cradling rollers 82 of conveyors 30, 32, as they commence their return travel, deliver eggs 22 to respective lower receiving curved cam tracks 120 which are equipped with a non metallic curved guard and direction rail 122. Extending over the terminus of each cam track 120 and beyond over elevational conveyors 130 and 132, are resilient thin pads 124, preferably of rubber, and terminating in strips 126 arranged adjacent one another and extending along conveyors 130 and 132. These pads 124 prepare eggs for entry to conveyors 130, 132 which commence operating below respective arrangements of curved cam tracks 120 and pads 124 as shown in FIGURES 1, 8 and 9.

Elevation changes

Conveyors 130, 132 receive eggs as they are recovering from their "turn" which may or may not be completed. Therefore these conveyors are designed to insure that each egg 22 will be adjusted enroute, as may be necessary, to present it to conveyors of grader 38 at the right elevation and with its major axis horizontal and crossways to the direction of its travel along this and follow on conveyors.

As specifically shown in FIGURES 9 and 10, conveyors 130, 132, include a continuous stationary shallow V track 144 over which cross bars or shafts 136 are driven by powered chains 140. Sleeves 138 rotating about shafts 136 roll over outside edges 145 of V track 144 which is mounted at 148 to conveyor assembly 132 as illustrated in FIGURE 10. By interaction of sleeves 138 and exposed portions of shafts 136 rubbing against eggs and of the simultaneous sliding contact of eggs with V track 144, each egg is moved until it is arranged with its major axis horizontal and perpendicular to its direction of travel on either conveyor 130 or 132, as it is pushed by a respective shaft or cross bar 136 throughout the conveyor length.

While this egg orientation occurs, conveyor 130 is raising each egg 22 up an incline to reach an upper level conveyor 166 of grader 38, and conveyor 132 is directing each egg 22 substantially horizontally to lower level conveyor 164 of grader 38.

Operation of either conveyor 130 or 132 is indicated in greater detail in FIGURES 8 and 9 which illustrate how driven chain 140 of inclined conveyor 130 is redirected around wheel 156 and returned about drivers 152. Also shown is the three pocket cam wheels 150 which include integral pushing and spacing ears or lugs 154 that serve to remove eggs 22 from conveyors 130 and 132 and direct them to grader conveyors 164 and 166 while maintaining their orientation and spacing.

TWO-LEVEL GRADER

Conveying

As viewed in FIGURES 1, 9 and 12, the two conveyors 164 and 166 of grader 38, although arranged parallel to one another are positioned at different elevations. Movement of eggs in each grader conveyor is undertaken by using a side by side chainlink conveyor. Each link 162 of a pair has upstanding arms 160 to push eggs 22 as they are cradled between their respective paired, spaced forward arms 160 and paired, spaced, following pushing arms 160. These cradles are derived by joining together identical paired link sections 162.

Placement of eggs 22 into these grader conveyor cradling spaces determined by links 162 is illustrated in FIGURE 9 where eggs are shown leaving spacing cam wheel 150 as they are lowered into contact with revolving arms 160 of these links 162. This transfer is substantially the same to lower conveyor 164 as it is to upper conveyor 166 as illustrated in FIGURE 9.

Grading

Once each egg 22 is underway along either lower conveyor or upper conveyor 166, although it is being pushed by a pair of upstanding arms 160, it is also sliding along grader rails 167, 168. Across the span of grader 38, at weighing station assemblies 170, these rails are interrupted to provide spaces for inserting paired weight sensing platforms 172, 174 over which eggs slide upon leaving the interrupted rails. The heaviest eggs 22 to be graded cause pivotal deflection or arcuate displacement of the first pair of platforms 172, 174. Because they are joined below chain link conveyor and pivot as a unit while rotatably supported on a post 176 secured to grader frame 192, motion of platform 172 carrying magnet 180 effectively operates mercury switch 182 without directly contacting it. The closing of switch 182 directs electrical energy through wires 186, 188 to an egg ejector assembly 190 and more particularly to a coil clutch mechanism 196 of this assembly, engaging it briefly to a continuously powered drive shaft 194. Portions of this clutch mechanism 196 support a clutch ejector 198 which during this brief powered drive shaft engagement is rotated transversely into contact with an egg 22 which has just passed over sensing platforms 172, 174. Such timely contact and motion by padded ejector 198 at right angles to conveyor motion removes egg 22 from between pushing arms 160 of links 162 and down ramp 200 or into lowering brush 214 as shown in FIGURES 11 and 12.

At each follow-on egg weight sensing station 170, platforms 172, 174 are made more sensitive to egg weights to establish other grades by revolving and advancing adjustable counterweight 178 along its threaded pivot arm 179 which is pivotally mounted to support post 176. This arm 179 is extended beyond post 176, to serve also as a pivot arm for weight sensing platforms 172 and 174.

To accurately position platforms 172, 174 in alignment with grader rails 167, 168 while awaiting arrival of an egg 22 of selected weight, a vertical cylindrical stop 184 is adjustably placed below counterweight 178. Stop 184 also serves to dampen any possible oscillations of pivot arm 179 after an egg leaves sensing platforms 172, 174. A structural guard and support 200 houses powered drive shaft 194 and clutches 196.

*Lowering graded eggs by brush to rollaway and holding trays*

After eggs 22 are selected by weight and removed from higher conveyor 166, they land on starting ramp 217 of bristle guide 218 as indicated in FIGURES 11 and 12. They move over ramp portion 217 and continue on into revolving brush 214 which is secured to powered shaft 216. Their entry into brush 214 is assured because bristles of brush 214 are momentarily held back by a combing action to provide a reasonably continuous brush opening 222. The combing action is continuously undertaken while brush 214 rotates because of the functioning of cross rod assembly 22 which is adjustably placed in the path of all bristles just before they reach ramp 217.

The preferred brush 214 for this egg lowering function is made of nylon bristles of .012″ diameter arranged in a brush which is 10″ in diameter and 10″ long. The bristles are assembled in a tape base and then spirally wound on shaft 216. As illustrated in FIGURE 12, entry of an egg 22 into brush 214 occurs above and forward of its center of rotation about axle 216. The combined action of brush bristles and bristle egg guide 218 results in soft landing of eggs 22 on rollaway rollers 202.

*Rollaways and trays*

These rollaway rollers 202 are rotatable about their centers and are grouped with other, spaced apart, and moved by driven chain 204 as shown in FIGURES 11 and 12. They receive eggs 22 that are leaving both the combination of brush 214 and guide 218, and also those eggs 22 that are leaving ramp 200. After a rollaway transport, eggs 22 are discharged on to trays 210 as rollaway rollers 202 change direction about their guide pulleys 206.

*Multiple grading on two levels with graded eggs automatically reaching tray sections designed to receive specific grades of eggs*

This grading that occurs along two conveyors 164, 166, one of higher elevation than the other as shown in FIGURES 1, 11 and 12, may be adjusted to create a multiple choice of grades based on different weights of eggs being processed. Such adjustments are made by the placement of weighing station assemblies 170 at selected locations which are made either closer together or farther apart during assembly of the machine 20 or by temporarily omitting assemblies 170 as indicated in FIGURE 1 at unfilled location 226.

Grade division barriers 228 are used to provide more side by side "rollaway roller and tray receiving areas" for a greater number of grades of eggs.

As shown in FIGURE 1, there are six grades of eggs determined along higher conveyor 166 which are indicated by the location of "lowering" brushes 214. There are also six grades of eggs determined along lower conveyor 164. If all lower stations 170 are set identically to their nearby stations above, then all eggs 22 would be directed into a resulting total of six grades of eggs based on their weights. Or these lower weighing station assemblies 170 could be set differently increasing the "selectivity" of the grading and thereby directing eggs into more than six grades by weight. Generally weighing assemblies 170 are not used at the end of the conveyors and may be omitted. In lieu thereof there will be scoop deflectors to guide the remaining eggs from the conveyors into a brush 214 above or the grading tray 210 below. Other arrangements of units and adjustments of units are readily undertaken depending on the practical demand for grading variations.

SUMMARY

The processing of eggs, which concerns their cleaning, sanitizing and grading, is undertaken economically and efficiently by operating machine 20 which is conveniently arranged and which is easily adjusted to match all reasonable grading demands. The following specific improvements incorporated in machine 20 are:

To improve cleaning compositely arranged non-metallic, i.e. nylon, and metallic, i.e. stainless steel bristles are used in oppositely wound counter-rotating brushes 90 as further described in related application Ser. No. 674,319, filed on Oct. 10, 1967;

To improve drying a traveling sponge is used which is self drying;

To improve centralization of all related operations, eggs are grouped on a channeling cross loader 24 for candling, cornered and converged at 28 for entry to cleaners, cornered and guided at 36 to two levels for grading, and then returned to a one level tray 20 of multiple grading subdivisions;

To improve turning of eggs at 28, brushes are used effectively with cam plates and moving coiled spring conveyors;

To improve turning and orientation at 36 curved ramps, pads and adjustable elevation V bottom cross roller conveyors are used;

To improve the selectivity of grading, two level grading is undertaken with brushes being used to lower eggs back to a one level grading tray;

To improve the accurate and quick response of egg weights sensors and the response of associated electrical switches, their related operations require no direct contact as magnets, without making contact, are carried by weight sensors past mercury switches.

We claim:

1. An automatic egg processing machine which continuously conveys eggs while they are candled, cleaned, sanitized and graded by weight, comprising:
   (a) a loading conveyor with a moving roller surface wherein the rolls are formed to arrange eggs into aligned rows;
   (b) a candling station arranged over the loading conveyor for observation of eggs traveling in rows;
   (c) a cornering and converging conveyor to rotate each egg changing the position of its major axis from being perpendicular to its original conveyed direction to being parallel to it and then moving rotated eggs by groups from multiple rows on to two parallel conveyors operating at right angles to the original conveyed direction;
   (d) a cleaning assembly of egg surface processing equipment having a housing; parallel conveyors extending from the cornering and converging conveyor through the housing of the assembly and beyond; sets of cleaning brushes mounted on the housing and counter rotated utilizing non-metallic and metallic bristles to brush eggs as they rotatably move along the parallel conveyors; mixing, pumping and spraying equipment connected to the housing to spray hot water and detergent over eggs being brushed by non-metallic and metallic bristles; sets of additional cleaning brushes mounted on the housing and counter rotated utilizing non-metallic bristles to brush eggs as they continue to rotatably move along the parallel conveyors; sanitizing equipment connected to the housing to spray a chemical solution over eggs being brushed by these non-metallic bristles; sets of drying brushes mounted on the housing and counter rotated utilizing non-metallic bristles to brush eggs as they continue to rotatably move along the parallel conveyors; exhaust equipment connected to the housing to withdraw moisture from around the drying brushes and eggs; and, water removal equipment connected to the housing to remove water from the eggs, conveyor, and interior of the housing;

(e) a cornering and elevating conveyor to guide each egg changing the position of its major axis from being perpendicular to its conveyed direction through the cleaning assembly to being parallel to such direction, and to guide each egg, after such major axis change in a direction at right angles to the cleaner conveyor to reach one of two levels of conveyors of an egg grader, at all times keeping and seeking to keep the major axis of the egg perpendicular to the direction of travel toward the egg grader; and (f) an egg grader having, two levels of conveyors each being equipped with weight sensor assemblies that remove predesignated weight eggs from a respective conveyor; ramps to receive removed eggs; a grading tray located substantially at the level of one conveyor; and soft landing assemblies to lower removed eggs from the upper conveyor level.

2. In an automatic egg processing machine, as claimed in claim 1, the said cornering and converging conveyor, comprising:
   (1) lower receiving cam tracks located adjacent to each terminus of each egg row established by the said loading conveyor to receive eggs leaving such conveyor with their major axis perpendicular to their direction of motion;
   (2) brushes rotating by the lower receiving cam tracks to retard one end of each respective egg;
   (3) continuous paired coiled spring drives commencing below the lower receiving cam tracks to contact the retarded egg swinging it about and conveying it on with its major axis aligned with its direction of travel and delivering the eggs in two loading groups at spaced delivery locations to two respective multiple spool conveyors; and
   (4) two spaced multiple spool conveyors operating at right angles to the paired coiled spring drives each conveyor receiving at intervals one grouping of eggs from one group of the paired coiled spring drives and conveying them on for cleaning.

3. In an automatic egg processing machine, as claimed in claim 1, the said cleaning assembly having said water removal equipment comprising: continuous sponge covered belts power driven around pulley wheels and over offset idler roller all rotatably mounted on the housing below each conveyor and the sponge cover of the belt being in contact with moving conveyor components and traveling faster in the same direction to wipe water from these conveyor components and thereafter discharging absorbed water below as the sponge covered belt on its return run goes up and over the offset idler roller.

4. In an automatic egg processing machine, as claimed in claim 1, the said cornering and elevating conveyor comprising: a curved cam track with side rail and pads to receive eggs and change their direction of motion from the direction of conveyors bringing eggs from the cleaning assembly to the direction of conveyors delivering them at respective levels to the egg grader.

5. In an automatic egg processing machine, as claimed in claim 1, the said cornering and elevating conveyor, comprising: changing elevation conveyors having a V track base; cross shafts with sleeves for rolling contact with top of the V track; and continuous powered chains for moving the cross shafts over the V track at spaced intervals to receive and to convey eggs moving them about as necessary to arrange each of them with its major axis perpendicular to the direction of motion along the V tracks of these elevation change conveyors in preparation for like positioning transfer to conveyors of the two level egg grader.

6. In an automatic egg processing machine, as claimed in claim 1, the said egg grader having said weight sensor assemblies comprising: an adjustable counterweighed tilting split platform which continues the conveyor support function until an egg of a weight greater than a pre-designated weight passes on to the split platform at which moment tilting occurs; a magnet carried by the tilting platform; a mercury switch located near, but not in, the travel path of the magnet to be actuated by it as it passes by on the tilting platform; and an egg ejector assembly triggered by operation of the mercury switch to remove the egg from the conveyor after it has tilted the split platform.

7. In an automatic egg processing machine, as claimed in claim 1, the said egg grader having said soft landing assemblies to lower removed eggs from the upper conveyor level, each one comprising: an egg guide commencing as a starting ramp located adjacent a weight sensor assembly and continuing on also as a brush bristle guide until reaching the level of the said grading tray; a powered rotating brush mounted to rotate with its bristles closely following the egg guide; and a combing bar mounted crosswise in the peripheral path of the brush bristles before they reach the starting ramp of the egg guide to create pockets among the bristles opposite this starting ramp into which eggs move to be carried down in the brush to grading tray level for a soft landing.

8. In an automatic egg processing machine, as claimed in claim 1, where the bristles that are counter rotated in the cleaning assembly are all non-metallic bristles.

9. An automatic egg processing machine which continuously conveys eggs while they are candled, cleaned, sanitized and graded by weight, comprising:
   (a) a loading conveyor formed to arrange eggs into aligned rows as the eggs are conveyed;
   (b) a candling station arranged near the loading conveyor;
   (c) a converging conveyor to receive multiple rows of eggs and converge them into fewer parallel rows;
   (d) a cleaning assembly of egg surface processing equipment, to receive eggs from a converging conveyor, having a housing; parallel conveyors extending through the housing and beyond; sets of cleaning brushes mounted on the housing and counter rotated utilizing bristles to brush eggs as they rotatably move along the parallel conveyors; mixing, pumping and spraying equipment connected to the housing to spray hot water and detergent over eggs being brushed by non-metallic and metallic bristles; sets of additional cleaning brushes mounted on the housing and counter rotated utilizing non-metallic bristles to brush eggs as they continue to rotatably move along the parallel conveyors; sanitizing equipment connected to the housing to spray a chemical solution over eggs being brushed by these non-metallic bristles; sets of drying brushes mounted on the housing and counter rotated utilizing non-metallic bristles to brush eggs as they continue to rotatably move along the parallel conveyors; exhaust equipment connected to the housing to withdraw moisture from around the drying brushes and eggs; and, water removal equipment connected to the housing to remove water from the eggs, conveyor, and interior of the housing;
   (e) an elevating conveyor to guide each egg to reach one of the two levels of conveyors of an egg grader, at all times keeping and seeking to keep the major axis of the egg perpendicular to the direction of travel toward the egg grader; and (f) an egg grader having, two levels of conveyors each being equipped with weight sensor assemblies that remove predesignated weight eggs from a respective conveyor; ramps to receive removed eggs; a grading tray located substantially at the level of one conveyor; and soft landing assemblies to lower removed eggs from the upper conveyor level.

References Cited

UNITED STATES PATENTS

| | | | |
|---|---|---|---|
| 2,442,475 | 6/1948 | Swanson | 15—3.13 |
| 2,690,576 | 10/1954 | Dreesman | 15—3.15 |
| 3,252,607 | 5/1966 | Rose et al. | 15—3.13 X |
| 3,360,817 | 1/1968 | Halverson | 15—3.13 |

EDWARD L. ROBERTS, *Primary Examiner.*

U.S. Cl. X.R.

15—3.13